United States Patent
Rahaman et al.

(10) Patent No.: US 10,140,447 B2
(45) Date of Patent: Nov. 27, 2018

(54) ATTACK PATTERN FRAMEWORK FOR MONITORING ENTERPRISE INFORMATION SYSTEMS

(71) Applicant: SAP SE, Walldorf (DE)

(72) Inventors: Mohammad Ashiqur Rahaman, Joan les Pins (FR); Cedric Hebert, Mougins (FR); Juergen Frank, Landenburg (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 14/966,885

(22) Filed: Dec. 11, 2015

(65) Prior Publication Data

US 2017/0169217 A1 Jun. 15, 2017

(51) Int. Cl.
*G06F 21/55* (2013.01)
*G06N 5/04* (2006.01)
*G06N 99/00* (2010.01)
*G06F 21/56* (2013.01)

(52) U.S. Cl.
CPC .......... *G06F 21/554* (2013.01); *G06F 21/566* (2013.01); *G06N 5/047* (2013.01); *G06N 99/005* (2013.01); *G06F 2221/034* (2013.01)

(58) Field of Classification Search
CPC ........ G06F 21/50; G06F 21/55; G06F 21/554; G06F 21/566; G06F 2221/034; G06N 5/047; G06N 99/005
See application file for complete search history.

(56) References Cited

U.S. PATENT DOCUMENTS

| | | | |
|---|---|---|---|
| 6,775,657 B1 | 8/2004 | Baker | |
| 6,839,850 B1 | 1/2005 | Campbell et al. | |
| 7,181,768 B1 | 2/2007 | Ghosh et al. | |
| 7,313,618 B2 | 12/2007 | Braemer et al. | |
| 7,788,718 B1* | 8/2010 | Fei | H04L 63/1458 726/14 |
| 7,844,829 B2 | 11/2010 | Meenakshisundaram | |
| 2003/0188189 A1 | 10/2003 | Desai et al. | |
| 2004/0117658 A1 | 6/2004 | Klaes | |
| 2007/0073519 A1* | 3/2007 | Long | G06F 11/3636 702/185 |
| 2010/0212013 A1 | 8/2010 | Kim et al. | |

(Continued)

OTHER PUBLICATIONS

Eckmann et al., "STATL: An Attack Language for State-based Intrusion Detection," Journal of Computer Security, vol. 10, 1-2, Jul. 2002, pp. 71-103.

(Continued)

*Primary Examiner* — Ayoub Alata
(74) *Attorney, Agent, or Firm* — Fish & Richardson P.C.

(57) ABSTRACT

Implementations of the present disclosure include methods, systems, and computer-readable storage mediums for receiving parameters defining a detection technique, an attack scenario, and detection logic, receiving configuration data that is specific to a target system that is to be monitored, providing an attack pattern based on the parameters and the configuration data, monitoring the target system based on the attack pattern and data provided by one or more logs of the target system, and selectively generating, based on monitoring, an alert indicating a potential end-to-end intrusion into the target system.

20 Claims, 8 Drawing Sheets

(56) References Cited

U.S. PATENT DOCUMENTS

2015/0033322 A1   1/2015  Wang et al.
2015/0237067 A1*  8/2015  Talyansky ............... H04L 67/02
                                                      726/23

OTHER PUBLICATIONS

Meier et al., "SHEDEL—A Simple Hierarchical Event Description Language for Specifying Attack Signatures," Proceedings of the IFIP TC11 17th International Conference on Information Security: Visions and Perspectives, International Federation for Information Processing 2002, (2002), 13 pages.

Cuppens et al., "LAMBDA: A Language to Model a Database for Detection of Attacks," Springer-Verlag Berlin Heidelberg 2000, RAID 2000, LNCS 1907, Nov. 2000, pp. 197-216.

* cited by examiner

| Available Responses | | | |
|---|---|---|---|
| | | 242 | |
| Response Type | Response Value | Processor | Rating |
| Notification | E-mail | Andrei | High |
| Informative | Security note references | Riyadh | High |
| Feedback | Re-train the system | Riyadh | Medium |

ATTACK PATTERN FRAMEWORK FOR MONITORING ENTERPRISE INFORMATION SYSTEMS

BACKGROUND

Intrusion detection systems (IDSs) can detect attacks on network-hosted systems. For example, an IDS can receive and analyze evidence of attacks by searching digital patterns over network and/or host traffic. Increasing complexity of enterprise information systems (EISs) obliges enterprises to deploy multiple, yet isolated, IDSs in their information technology (IT) boundaries (e.g., network IDS (NIDS), host IDS (HIDS), application-level IDS (appIDS).

Modern exploits are disguisable and can appear to be innocent from an individual IDS perspective. However, maliciousness of a disguised exploit could be detected from an end-to-end application-level perspective. One of the core problems in this regard is the inability of detecting such end-to-end targeted attacks, whose functional scopes may stretch beyond business and IT boundaries.

SUMMARY

Implementations of the present disclosure include computer-implemented methods for end-to-end intrusions into enterprise information systems (EISs) at the application level. In some implementations, methods include actions of receiving parameters defining a detection technique, an attack scenario, and detection logic, receiving configuration data that is specific to a target system that is to be monitored, providing an attack pattern based on the parameters and the configuration data, monitoring the target system based on the attack pattern and data provided by one or more logs of the target system, and selectively generating, based on monitoring, an alert indicating a potential end-to-end intrusion into the target system. Other implementations of this aspect include corresponding systems, apparatus, and computer programs, configured to perform the actions of the methods, encoded on computer storage devices.

These and other implementations may each optionally include one or more of the following features: the configuration data includes one or more of exploitability, target significance, potential downtime, social media impact, patch provision window, legal implication, and corporate requirement relevance; the configuration data includes one or more of vulnerability type, severity level, log relevance, security notes, and execution frequency; actions further include tuning the attack pattern by adjusting one or more thresholds; providing the attack pattern includes providing one or more query scripts based on the parameters and the configuration data, the one or more query scripts being executed over the data provided by one or more logs during monitoring of the target system; the attack pattern is one of a misuse pattern and an anomaly pattern; and monitoring includes comparing the data provided by one or more logs of the target system to parameters of the attack pattern, and determining that at least a portion of the data matches the parameters of the attack pattern, and in response, generating the alert.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 2A-2E depict example screenshots in accordance with implementations of the present disclosure.

Like reference symbols in the various drawings indicate like elements.

DETAILED DESCRIPTION

Figure 1:
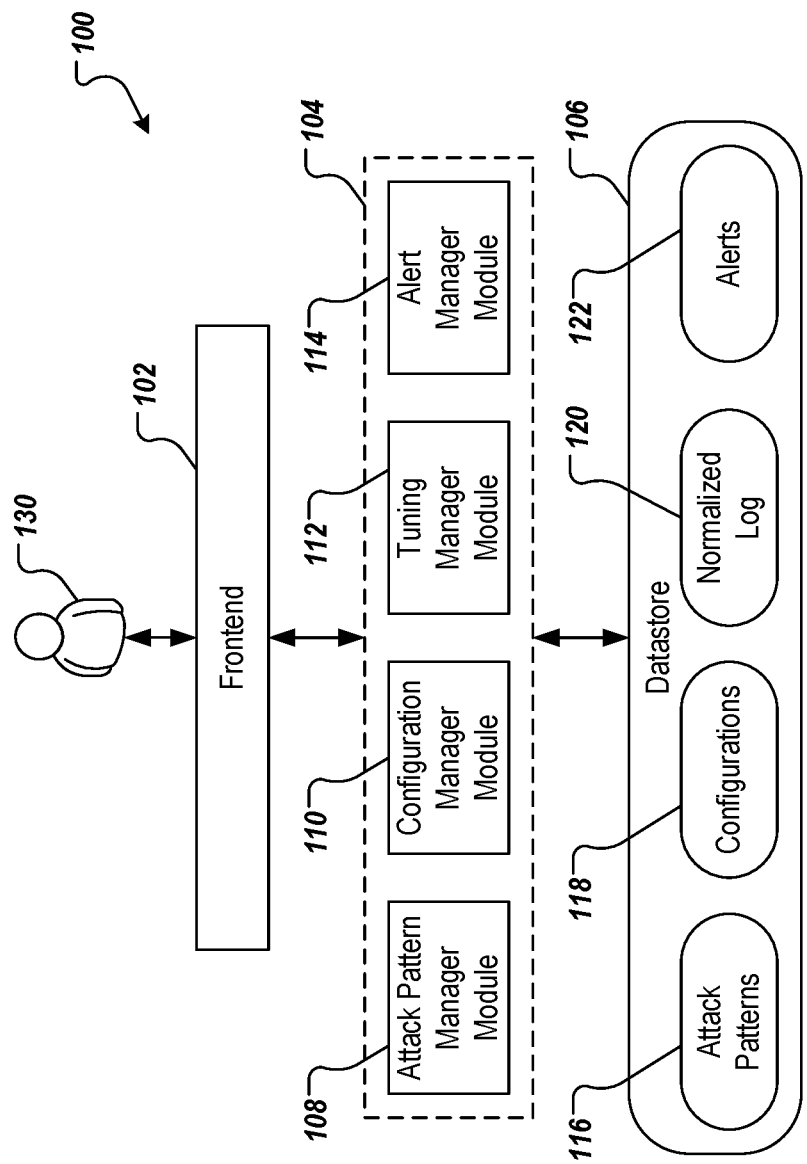
FIG. 1 depicts an example architecture in accordance with implementations of the present disclosure.

Implementations of the present disclosure are directed to application-level detection of intrusions into (attacks on) enterprise information systems (EISs). More particularly, implementations of the present disclosure are directed to real-time detection of complex end-to-end intrusions into EISs at the application level. In some examples, intrusion detection of the present disclosure is based on analysis of logs originating from various information technology (IT) boundaries (e.g., network, proxy, web server, operating system (OS), application). In some examples, an end-to-end intrusion refers to a security incident that involves malicious events originating from multiple IT boundary contexts (e.g. host, network, application etc.).

Implementations of the present disclosure provide an attack pattern framework (APF) for EISs. In some implementations, the APF enables an appIDS (e.g., SAP Enterprise Threat Detection (ETD) provided by SAP SE of Walldorf, Germany) to perform analysis and to detect malicious activities. In some implementations, the APF includes a reference system architecture having a reference attack pattern execution engine as part of an appIDS. In some implementations, the APF provides a specification language for attack patterns to support management of an attack pattern lifecycle (e.g., define, activate, deactivate, extend, update). In some examples, the APF provides a process to guide the security analyst towards an educated security incident response. In some examples, implementations of the present disclosure operate with existing NIDS/HIDS or patterns, and can blend them with application-level context to detect end-to-end intrusions.

To provide context for implementations of the present disclosure, modern EISs live in a heterogeneous and open IT landscape with hybrid architectures (e.g., on-premise, mobile, cloud). Consequently, attack channels are relatively wide. In some examples, an EIS is open and interoperable, because, for example, enterprise applications are accessible in the web and can be integrated with other non-native systems. In some examples, the functional scope of an EIS is extended from an on-premise setting toward cloud and mobile settings. As a result, a transaction including multiple tasks can run over multiple IT systems, and thereby may access sensitive resources and data. Moreover, cyber threats and 0-day attacks against enterprise software are on the rise. Existing intrusion detection techniques have been shown to be inadequate against such threats.

Despite the fact that enterprises deploy multiple IDSs in different IT boundaries (e.g., network, web server, in the host, in DMZs), it is not easy to detect a sophisticated end-to-end intrusion. An example reason for this is that respective intrusion detection models (e.g., NIDS, HIDS, appIDS) are not designed for detecting such an intrusion. Instead, and as provided by implementations of the present disclosure, such end-to-end attacks are only detected when events from multiple boundary sources are analyzed. In contrast to implementations of the present disclosure, current IDSs mainly detect intrusions on their respective zone, and as such, targeted end-to-end intrusions may go unnoticed. For example, a purchase order request may not be malicious from a network point of view. However, if the same purchase order is received from different systems, devices, and/or partners using the same credentials, submission of the purchase order is a malicious activity. In some examples, this can only be detected if logs from all the relevant entities are analyzed together.

Despite this complexity, it is important for enterprises that the attack scenarios are understood and managed by security analysts. In this regard, the APF of the present disclosure plays a vital role. More particularly, and as described in further detail herein, the APF of the present disclosure provides a reference attack pattern engine (APE) architecture that can be used by an appIDS, for example, for managing an attack pattern lifecycle, and configurations thereof. In some implementations, and as described in further detail herein, the APF provides an attack pattern specification language (APSL) that is human-readable and a computer-executable description of an attack scenario. In some examples, the APSL enables definitions of both misuse-based and anomaly-based attack patterns making the APSL flexible for an analyst to deal with various attack scenarios (e.g., known and unknown attacks).

In some examples, the target EIS landscape (e.g., the EIS being monitored by the IDS) may evolve in terms of its relevance and thereby the potential attack attempts. Consequently, the impact of such attacks on an enterprise may vary over time. To deal with such dynamics, the attack pattern specification of the present disclosure can be configured with relevant metrics (e.g., business metrics). It is understood that attackers always look for new ways and innovative exploits to attack a target system. In some examples, the APF enables a security analyst to redefine and/or to extend an existing attack pattern based on the metrics. This extension capability adds more flexibility to customize relevant patterns according to the particular needs of a respective EIS.

Further, as the target EIS evolves, appropriate incident handling can be adjusted accordingly using the APF. In this regard, an attack pattern process is described in further detail herein, which includes best practices for security analysts.

As described in further detail herein, implementations of the present disclosure provide log-based, real-time intrusion detection. In some examples, to understand the end-to-end context of a malicious activity, logs and traces from the target systems can be helpful. In some examples, it is understood that (security) critical interactions with the target systems (EISs) leave some traces in the form of logs. The underlying appIDS gathers and aggregates cross-silo logs and events in real-time. In some examples, real-time extraction can be performed by, for example, an event processing system (e.g., SAP Sybase Event Stream Processor provided by SAP SE of Walldorf, Germany), which pushes the relevant log entries to a powerful backend system (e.g., SAP HANA provided by SAP SE of Walldorf, Germany), on which intrusion detection functionality is executed. In some examples, the logs are normalized before the intrusion detection functionality executes to analyze the intended behavior stipulated in the log entries. Based on the analysis result, alerts are generated, which can be investigated by the security analyst.

In accordance with implementations of the present disclosure, the APF is provided as a core building block of an application-level IDS (appIDS). In some examples, the APF includes a reference architecture, the APSL, and an attack pattern process. In some implementations, the reference architecture provides attack pattern execution building blocks. In some implementations the reference architecture of the APF provides attack pattern management, configuration management, and attack pattern tuning.

In some implementations, attack pattern management includes defining, activating, deactivating, and execution of attack patterns. In some examples, business configurations, and/or technical configurations are associated to an attack pattern specification, which can ensure a meaningful incidence handling specific to a target landscape (EIS). To cope with more sophisticated attackers (e.g., attackers using unconventional and innovative ways to remain undetected), attack pattern tuning enables the attack patterns to be adjusted. This also enables extension of and/or building on top of pre-defined attack patterns (e.g., default attack patterns provided by the APF). In some examples, an alert framework is provided to generate alerts, which can be based on the configuration information. For example, appropriate response mitigation can be determined based on the configuration information, and can be conveyed as part of an alert.

FIG. 1 depicts an example reference architecture 100 of the APF in accordance with implementations of the present disclosure. The example reference architecture 100 includes a frontend 102, backend attack pattern components 104, and a datastore 106. In the depicted example, the backend attack pattern components 104 include an attack pattern manager module 108, a configuration manager module 110, a tuning manager module 112, and an alert manager module 114. In the depicted example, the data store 106 includes an attack patterns data store 116, a configurations data store 118, a normalized log data store 120, and an alerts data store 122.

In some implementations, the frontend 102 is provided as one or more computer-executable programs executed by a computing device, such as a client-side computing device (e.g., a desktop computer, a laptop computer, a tablet computing device, a smartphone). In some implementations, the backend attack pattern components 104 are provided as one or more computer-executable programs executed by a computing device, such as a server-side computing device. For example, the client-side computing device can communicate with the server-side computing device over a network (e.g., a local area network (LAN), a wide area network (WAN), the Internet, a cellular network, or any appropriate combination thereof). For example, the frontend 102 can be provided as a plurality of graphical user interfaces (GUIs) displayed in a browser application executed by the client-side computing device. In some implementations, the datastore 106 is provided by the one or more server-side computing devices (e.g., hosted databases).

FIGS. 2A-2E depict example screenshots in accordance with implementations of the present disclosure. More particularly, FIGS. 2A-2E depict example GUIs that can be displayed by the frontend 102, each of which is described in further detail below.

In accordance with implementations of the present disclosure, the APF implements the backend logic (provided by the backend attack pattern components 104) for pattern creation, activation, deactivation and execution. In some examples, and with reference to FIG. 2A, a security analyst (e.g., a user 130 of FIG. 1) is supported by an attack pattern specification and configuration GUI 200, through which the user 130 can define an attack pattern. In some examples, the attack pattern is specified based on the APSL described in further detail herein.

Figure 2A:
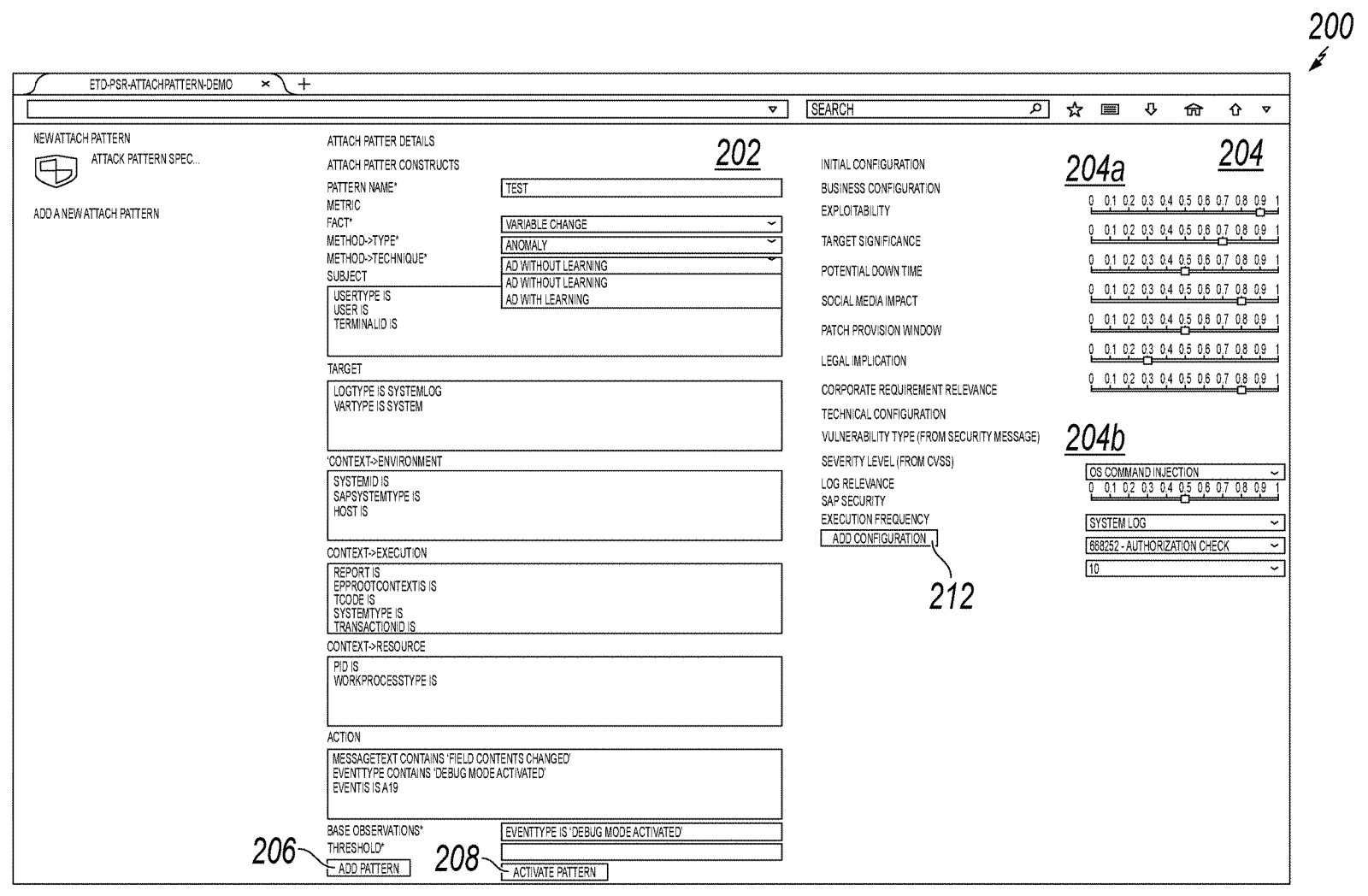

With continued reference to FIG. 2A, the GUI 200 includes an attack pattern constructs section 202, and an initial configuration section 204. In the depicted example, the initial configuration section 204 includes a business configuration sub-section 204a, and a technical configuration sub-section 204b. The attack pattern constructs section 202 includes a plurality of UI elements, through which the user can input information to define the attack pattern. Example information includes pattern name, metrics (e.g., fact, method→type, method→technique), subject, target, context→environment, context→resource, action, base observations, and threshold. In some examples, information can be selected from a plurality of values presented in a drop-down menu. In some examples, information can include text entered into a UI (e.g., a string, a number). An "Add Pattern" button 206, and an "Activate Pattern" button 208 are provided. In some examples, the "Add Pattern" button 206 can be activated (e.g., clicked on) to store the defined attack pattern in a data store (e.g., the attack patterns data store 116 of FIG. 1). In some examples, the "Activate Pattern" button 208 can be activated (e.g., clicked on) to activate the attack pattern within the IDS (e.g., the attack pattern is implemented with the IDS to detect end-to-end attacks).

The initial configuration section 204 includes multiple configuration parameters that can be assigned to the attack pattern being defined. In the business configuration sub-section 204a, example configuration parameters include exploitability, target significance, potential downtime, social media impact, patch provision window, legal implication, and corporate requirement relevance. In the technical configurations sub-section 204b, example configuration parameters include vulnerability type, severity level, log relevance, security notes, and execution frequency. In some examples, configuration parameters can be set using a slider-bar UI (e.g., ranging between 0 and 1 in 0.1 increments). In some examples, configuration parameters can be selected from a plurality of values presented in a drop-down menu. In some examples, configuration parameters can include text entered into a UI (e.g., a string, a number). An "Add Configuration" button 212 is provided, and can be activated (e.g., clicked on) to associated the configurations parameters with the defined attack pattern.

In some examples, specification (definition) of an attack pattern begins by defining the fact and method, as described in further detail below. In some implementations, the attack pattern manager (e.g., the attack pattern manager module 108 of FIG. 1) systematically auto-completes subsequent parts based on the previous part expression entries. Accordingly, the user can be guided through prefilled expressions with operands, described in further detail below. Upon activation (i.e., clicking on the "Activate Pattern" button 208), the attack pattern manager takes the input from different parts of the attack pattern specification, bundles the parts into a computer-readable and -executable notation (e.g., Javascript Object Notation (JSON)), and generates a corresponding query script (e.g., Structured Query Language (SQL) script), which can be executed when the attack pattern runs.

In some examples, for anomaly-based attack patterns, the attack pattern manager goes through a training phase to compute a baseline behavior of the target system (i.e., the EIS to-be monitored). In some examples, computation of the baseline can be performed using a machine learning library (e.g., SAP HANA PAL provided by SAP SE of Walldorf, Germany). During a subsequent detection phase, a deviation from the baseline behavior can be considered as an anomaly. In some examples, for misuse case patterns, a training phase is not required, because known attack scenarios are captured with known thresholds. Instead, any log event above the threshold could raise an alert.

In some implementations, the configuration manager (e.g., the configuration manager module 110 of FIG. 1) enables the user to manipulate the business and technical configurations associated with an attack pattern. As part of technical configurations, among others, a Common Vulnerability Scoring System (CVSS) rating associated with the known attacks and learning period associated with an anomaly pattern can be configured. In some examples, a CVSS rating reflects the technical severity of an attack scenario, but does not indicate the business impact specific to a target landscape.

Depending on the agility of a target landscape, varying business criteria configured for an attack pattern may have different business consequences. For example, in addition to a CVSS rating, availability of an exploit can significantly raise the risk level of a target system. Furthermore, if the target system does not deal with patient data, for example, the legal compliance (e.g., HIPPA compliance) may not be a concern. Similarly, knowing the patch time window, tolerable downtime, and social media influence, and the like serve as business configurations, which can be used to influence an alert severity computation.

Figure 2B:
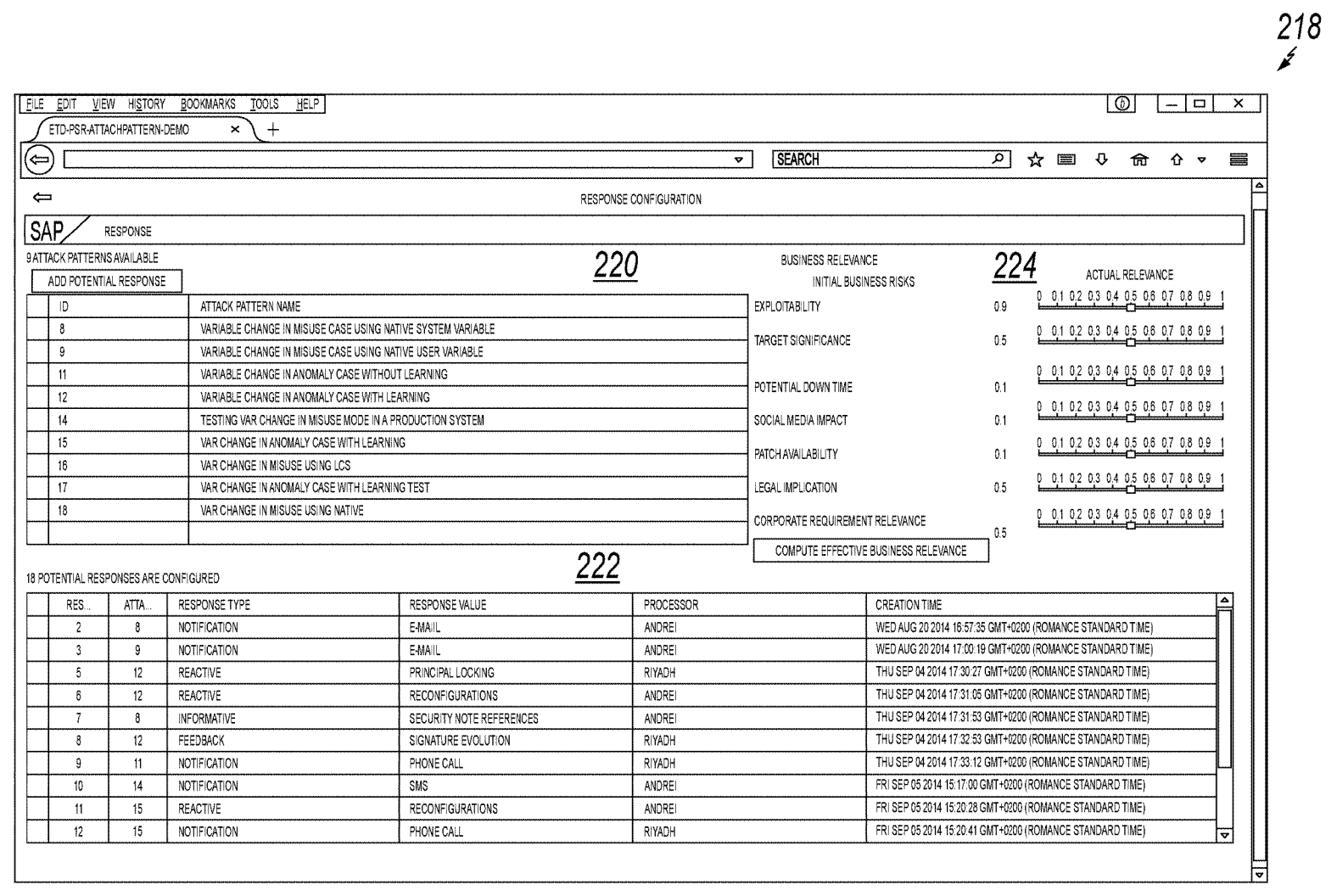

After business and technical configurations are associated with an attack pattern (e.g., the "Add Configuration" button 212 is clicked on), the user can configure potential incident handling options, referred to herein as response mitigation. FIG. 2B depicts an example response mitigation configuration and business relevance configuration GUI 218. The example GUI 218 includes an available attack patterns section 220, a configured potential responses section 222, and a business relevance section 224. In the example of FIG. 2B, 9 attack patterns have been defined and are available, and 18 possible responses are available. As described above, partner needs and/or customer landscape can evolve over time (e.g., after default attack patterns are provided). The APF of the present disclosure takes these dynamics into account, and enables users to configure their relevant metrics (e.g., actual business relevance criteria). More specifically, the introduction of business configuration, technical configuration, and business relevance makes the APF of the present disclosure extremely flexible with respect to customization for the customers and partners.

Figure 2C:
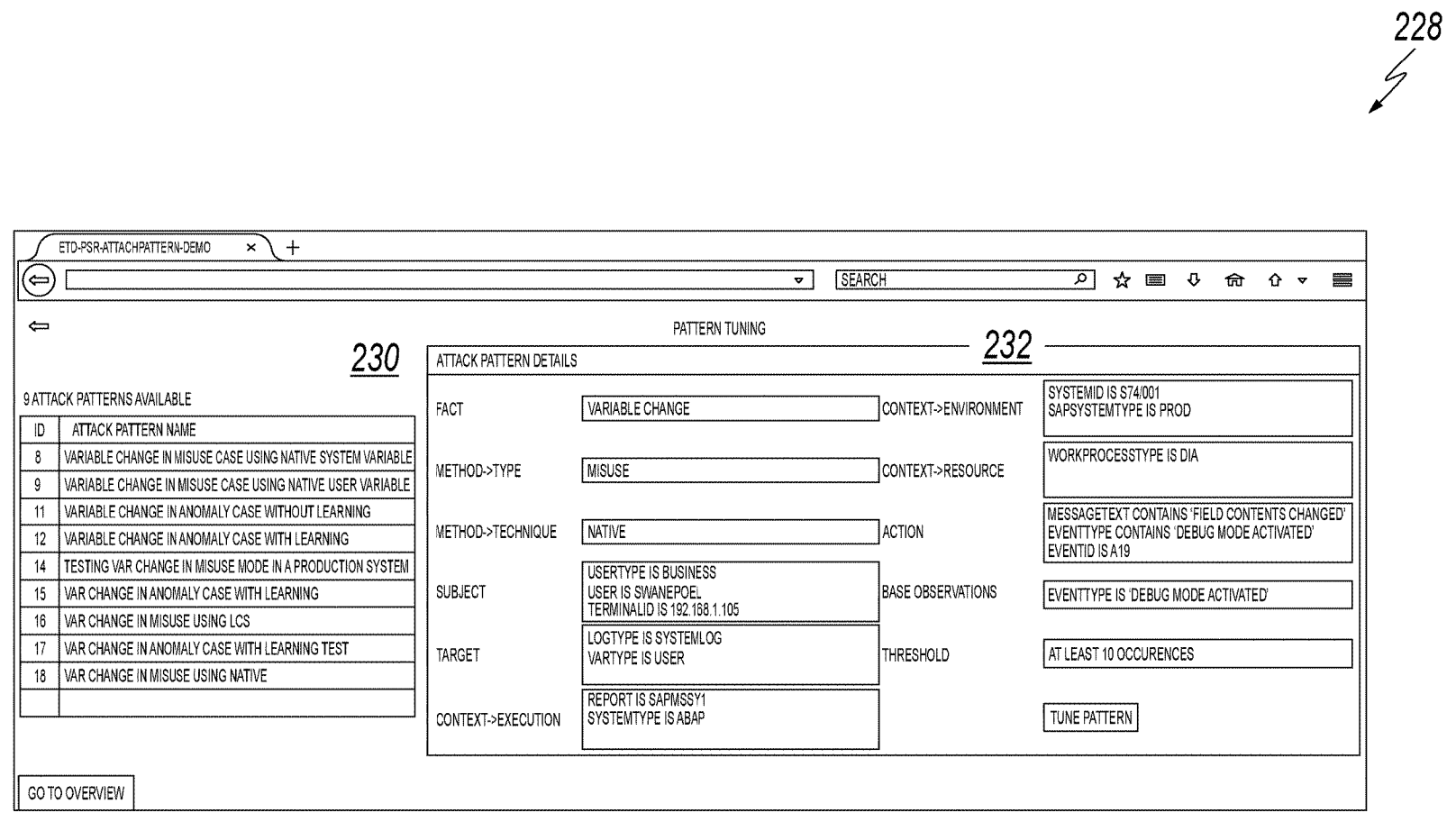

Based on the initial configurations and current business criteria the configuration manager computes effective business relevance values, which can be used as business severity level for educated incident handling, described in further detail below. FIG. 2C depicts an attack pattern tuning GUI 228 that enables a user to change any part of an attack pattern specification for misuse attack patterns. The example GUI 228 includes an available attack pattern section 230, and an attack pattern details window 232, which displays details of an attack pattern currently selected in the available attack patterns section 230. In some examples, the tuning manager (e.g., the tuning manager module 112 of FIG. 1) updates the attack pattern specification, if a change (e.g., extension and/or customization) in one or more building blocks of the attack pattern is requested. Once the change is confirmed, an equivalent description (e.g., JSON description) is used to generate the corresponding query scripts (e.g., SQL scripts) for the attack pattern.

In some implementations, the alert manager (e.g., the alert manager module 114 of FIG. 1) implements the computation logic of business relevance metric and appropriate incident response. In some examples, query scripts of respective attack patterns provided by the attack pattern manager are executed over the normalized logs (e.g., stored in the normalized log datastore 120 of FIG. 1).

In some implementations, in the event that a matching log entry is found, a technical severity is determined. In some examples, the technical severity is CVSS-based. In some implementations, an associated business relevance value (e.g., ranging from 0-10) is determined. The alert manager computes ratings of potential responses based on previously configured potential responses. Given business configurations of a target landscape, the higher the rating, the higher the recommendation, and vice versa. FIG. 2D depicts an example response recommendation for alerts GUI 240, which depicts available responses 242 for a respective attack pattern.

As introduced above, the APF of the present disclosure further provides the APSL, which is a structured language used to define an attack pattern. More particularly, an attack pattern specification is a structured representation of an attack scenario, and associated detection techniques. Characteristics of the APSL of the present disclosure include: simple and expressive (e.g., the APSL avoids verbosity without losing relevant expressivity for describing an attack scenario), generic (supports specification of known attack scenarios (e.g., misuse) and unknown attack scenarios (e.g., anomaly detection)), easily adopted (e.g., human-readable and intuitive to provide a relatively easy learning curve), straight-forward implementation (e.g., relatively easy machine-readable implementation), and extensible (e.g., reusable, customizable, build on top of an existing attack pattern).

Implementations of the APSL of the present disclosure are based on an extensive state of art analysis in the domain of attack language literature. This analysis was used to provide an attack language taxonomy. In some examples, the attack language taxonomy includes a plurality of attack language types with respective attack languages categorized thereunder (e.g., Event Language: STATL, SHEDE, BSM, TCP-Dump; Correlation Language: STATL, Lambda, SHEDEL, ADeLe, CRIM, RUSSEL, P-BEST, Snort, OSSEC; Exploit Language: ADeLe, CAPEC, NASL; Detection Language: STATL, Lambda, ADeLe, RUSSEL, P-BEST, CAPEC, CRIM, IDMEF, Bro, Snot, OSSEC; Reporting Language: IDMEF, CAPEC, OSSEC; Response Language: ADeLe, CAPEV, Snort, OSSEC).

A complete specification language could be built on top of the attack language types (e.g., expressing events, defining correlations, exploits, detection technique, reporting means, and response definition). However, such a complete specification language introduces relatively high verbosity. It was determined that most of the attack pattern languages support detection and correlation as part of the specification, and most refer to a rule-based approach when it comes to using expressions to specify different blocks of the attack pattern specification. In view of this, it was determined that, in order to be expressive without unnecessary verbosity, the APSL of the present disclosure should include two rule-based expression blocks: a detection block and an attack scenario block.

In some implementations, the detection block is composed of two sub-parts. A first sub-part is the detection technique, which specifies what factual action will be measured in the mathematical method. A metric is provided, which defines the measurement elements as denoted by a [fact] and [method] pair (e.g., {[fact], [method]}). In some examples, a fact is an action/event type that can be measured (e.g., login, connect, disconnect). In some examples, a method specifies the mathematical technique to be applied on the fact. A method can be straight-forward for misuse case patterns (e.g., 5 login failures), or as complex as statistical techniques (e.g., clustering) for anomaly cases.

A second sub-part is the detection logic that determines actual intrusions. In some examples, the detection logic includes base observations, provided as precondition rules that trigger threshold computations, and a threshold, provided as rules on subject/target/context/actions/observations that define boundary conditions to raise an alert. In some examples, in response to a base observation being evaluated as true, the threshold computation determines the bar, beyond which an action may generate an alert.

In some implementations, the attack scenario block includes a subject, a target, a context, and an action. In some examples, the subject describes the initiator principal of an action (e.g., user, process, systems, program). In some examples, the target describes the target and or target related entities (e.g., target system/application, files, dbs, programs, relevant log, system/user variable). In some examples, the context describes situational data (where, when, which) associated with the action. Contexts can include an environment context, an execution context, and a resource context. In some examples, the environment context describes the physical space (e.g., host machine, system id, client, terminal). In some examples, the execution context describes the time space and or session identification data (e.g., timestamp, transaction id, connection id). In some examples, the resource context describes the actual component/processes (e.g., Gateway, ABAP DIA process) generating the action. In some examples, the action describes the actual measurable action performed by the subject.

At a higher-level, the attack scenario block is a structured representation of an intrusion from the point of view of an attacker. An intrusion origin and its potential target are described as the subject and the target, respectively. The situational context of an intrusion is further specified in the three rule parts describing where (i.e., environment), when (i.e., execution) an intrusion has occurred, and also which (i.e., resource) component of environment context actually generates the measurable action. The action block is the actual observed action in the log entries, which can be measured, and therefore, is also used in the fact definition.

The APSL serves as a template. Consequently, and depending on the attack scenario, some parts may not be filled in. To provide further context, example attack pattern specifications are provided.

A first example attack pattern specification describes a malicious activity (e.g., variable change during debugging) by a developer. This specifies a misuse case pattern as the threshold is reached as soon as 100 occurrences of variable change is observed. The example specification is provided as:

```
Variable Tempering Profile {
    "Metric": {
        "Fact": "Var change",
        "Method":{
            "Type": "Misuse",
            "Technique":"SubString matching"
        }
    },
    "Subject":[UserType is "DEVELOPER", UserID: starts with "R",
              TerminalID: ends with "h"] ,
    "Target": [Platform Type is "ABAP"] ,
    "Context": {
        "Environment": [SystemId is "S74/001", SAPSystemType is
            "PROD"],
        "Execution": [TransactionCode: "SE38"]
    },
    "Action":["MessageText contains 'Field contents
              changed'","EventId is A19"],
    "Base Observations":["EventType is 'Debug mode activated'"],
    "Threshold": [MaxOccurance is "100"]
```

Example 1: Variable Tampering During Debugging (Misuse Case)

A second example attack pattern specification describes the first example attack scenario from an anomaly point of view. Therefore a baseline behavior (e.g., usual occurrence frequency of variable change) is learnt before detecting a deviation (e.g., unusual occurrence frequency of variable change). The deviation logic is captured in the threshold from the point of view of maximum anomalous host system (e.g., 10% of total host can be malicious). The example specification is provided as:

```
Variable Tempering Profile {
    "Metric":{
        "Fact":"VariableChange",
        "Method":{
            "Type":"Anomaly",
            "Technique":"Anomaly Detection with learning"
        }
    },
    "Subject":["UserType is BUSINESS"],
    "Target":[Platform Type is "ABAP", "VarType is SYSTEM"],
    "Context":{
        "Environment":["SAPSystemType is PROD"],
        "Execution":["Report is SAPMSSY1","SystemType is ABAP"],
        "Resource":["WorkProcessType is DIA"]
    },
    "Action":["MessageText contains 'Field contents changed'","EventId
              is A19"],
    "BaseObservations":["EventType is 'Debug mode activated'"],
    "Threshold":["Host 10%"]
}
```

Example 2: Variable Tampering During Debugging (Anomaly Case)

A third example attack pattern specification detects a malicious misuse scenario (e.g., multiple external RFC server registrations having the same RFC service name from two RFC client hosts). For example, because an external client registration request has to first go through, for instance, a NIDS (e.g., snort) before passing to the RFC gateway, log events originating from snort and RFC gateway are correlated in the base observations. The base observation checks connection establishment from a subject to a target host through the network, therefore, through snort and to an enterprise system through the RFC gateway. The threshold evaluates to true when multiple registrations with same RFC service name are found in office hour. From, the snort perspective, any such request is innocent. However, whenever the RFC gateway comes into the context multiple requests of same RFC service name registrations would clearly be a malicious one. The example specification is provided as:

```
Malicious external RFC server registration Profile {
    "Metric":{
        "Fact":"Registration Count",
        "Method":{
            "Type": "Misuse",
            "Technique":"Substring matching"
        }
    }
    "Subject": ["Host is '10.20.3.4' or '10.20.3.5'"],
    "Target": ['suspiciousRFCservice'],
    "Context": {
        "Environment context": ["SAPSystemType is PROD" and "SystemID
            is ABC"],
        "Execution context": [office hour],
        "Resource context": [RFC Gateway, SNORT]
    },
    "Action": ['Registration'],
    Base observations: [Conn(Subject(ip), ResCon(RFC Gateway)) and Conn(
            Subject(ip), EnvCont(SystemID), ResCon(RFC
            Gateway))]
    Thresholds: [No(Registration) > 1 and Period(Conn) is in ExeCon( )],
}
```

Example 3: Malicious External RFC Server Registration (Misuse Case)

In view of the above-described example attack pattern specifications, it is clear that the APSL of the present disclosure is able to specify both simple and complex end-to-end intrusions in terms of misuse- and anomaly-based attack patterns.

As introduced above, the APF of the present disclosure further provides an attack pattern methodology, which provides a systematic workflow for educated incident response decision. In this manner, users (e.g., security analysts) are able to configure and customize their own set of attack patterns appropriate to respective target systems (EISs). Further, users can adjust specified attack patterns in view of ever evolving business relevance metrics to provide effective alert severity computation. Users are also able to take educated response decisions based on the rated recommendation with respect to the business severity alert (see, e.g., FIG. 2D).

As described in further detail below with reference to FIG. 3, the attack pattern methodology of the present disclosure provides a step-by-step, iterative process to optimize use of the APF. Whenever a user would like to adjust an attack pattern and associated configuration, the user can do so in an iterative manner. In some examples, the iterative nature of the workflow enables adjustment of attack patterns according to business needs, and also reduced false alerts (e.g., by increasing/decreasing the threshold). Users are able to converge to a mature set of attack patterns that can be reused with minimal effort.

In accordance with implementations of the present disclosure, separation of detection technique, attack scenario, and detection logic (e.g., in the APSL) provides a more intuitive approach for users. Further, the APF strengthens this by supporting systematic filtering, and auto-completion, as described in further detail herein. In order to make the specifications of detection logic and attack scenario human-readable and intuitive, a set of operators and a set of operands that are supported by the APF are provided, as described in further detail below.

Implementations of the APF support a list of operators for any log type and can be used in the attack scenario and detection logic expressions. Example operands supported by implementations of the present disclosure:

UserType, User, TerminalId, SystemId, SAPSystemType, Host
TransactionId, Tcode, ERPRootContextId, Timestamp, SessionId, PID, StackType
MessageText, EventType, EventID Example operators supported by implementations of the present disclosure:

Subject, Target and Context
  "starts with," "ends with," "contains," "is greater than or equal to," "is less than or equal to," "is less than," "is greater than," "is not," "is"
Threshold-misuse Case
  "Between X and Y occurrences," "Minimum X occurrences," "At least X occur"
Threshold-anomaly Case—without learning
  "Host 10%", "SID 10%," "Terminal 10%," where 10% is the percentage of the outliers that can be found in the result table after PAL execution (PAL with anomaly detection algorithm)
Threshold-anomaly Case—with learning
  "On host per day," "On SID per day," "On terminal per day," "On host per timeframe," "On SID per timeframe," "On terminal per timeframe"

In some implementations, the attack pattern manager, the configuration manager, the tuning manger, and the alert manager, are provided as server-side JavaScripts, and each exposes, for example, corresponding XSODATA services. In some examples, the respective frontend GUIs (e.g., GUIs of FIGS. 2A-2E) are implemented in SAP UI5, which includes HTML5, and client-side JavaScripts. In some implementations, the attack pattern manager takes input from different building blocks of the attack pattern specification, bundles the input in a JSON-based notation, and creates corresponding SQL scripts, which are executed over the normalized logs in the datastore (e.g., database). In some examples, a SQL script-based stored procedure triggers attack pattern matching over the logs in a regular interval. In the event that a match is found, the APF provides an alert (notification) with a pop-up message in the frontend.

In accordance with implementations of the present disclosure, the APF can be configured in either a pull mode, or a push mode for log retrieval. The particular mode can be selected based on the target system. Further, and with respect to scalability, an example prototypical implementation of the APF includes 10 attack patterns with a relatively low memory footprint (e.g., approx. 10 Mb) required for backend logic computation. In some examples, by pre-computing the attack patterns, runtime artifacts (e.g., SQL scripts) do not increase the memory footprint.

Figure 2E:
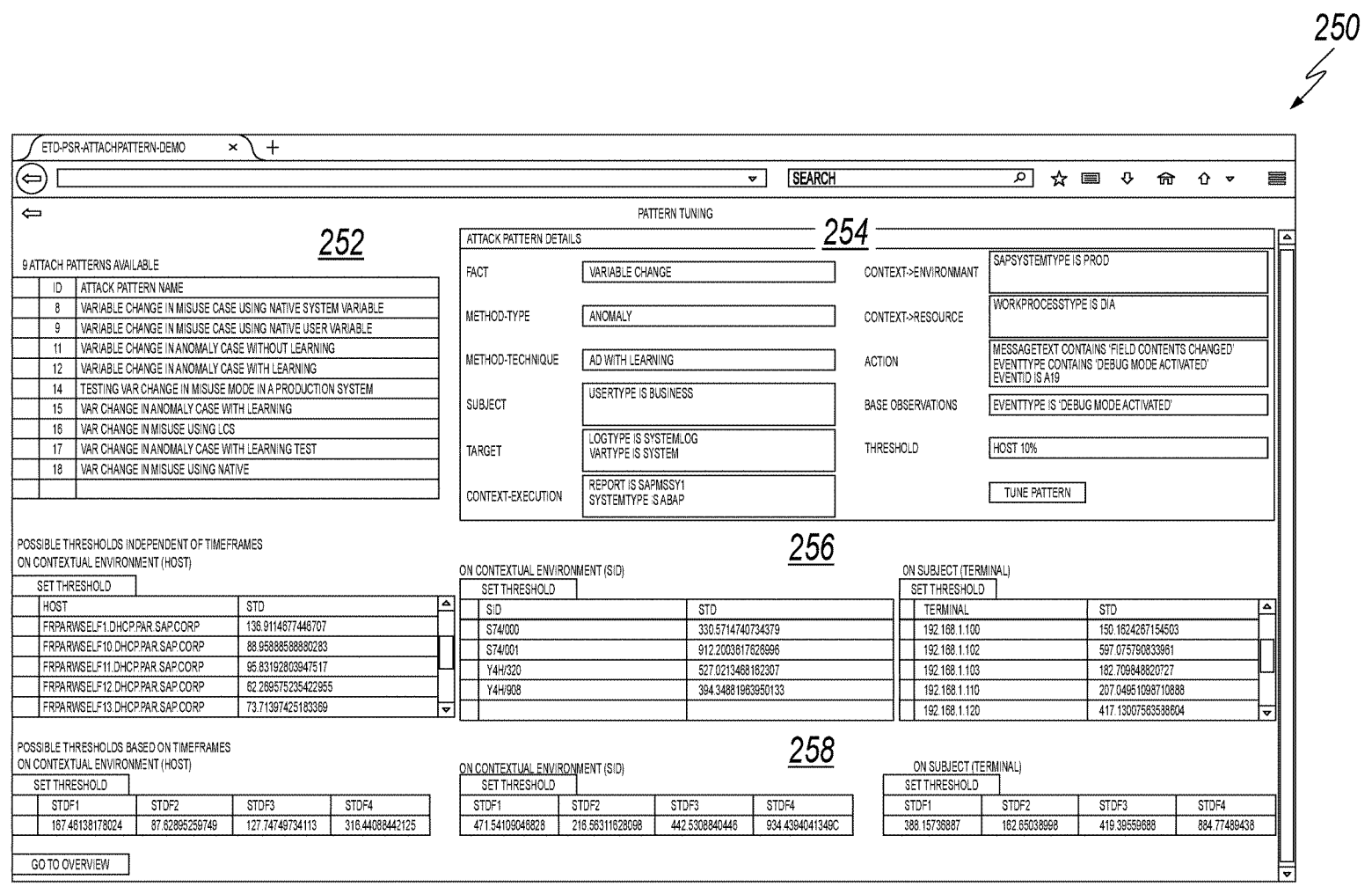

In some implementations, the APF of the present disclosure enables adjustment of existing anomaly-based attack patterns. In some examples, an effective baseline is maintained to determine deviations therefrom. Because the baseline is specific to the target system, the APF of the present disclosure enables a user to adjust relevant parameters for determining the baseline of the particular target system. In some examples, a user is able to choose among host, system, and terminal to compute baseline behavior (e.g., in 6 hours or 24 hours timeframe). Then, during the detection phase, an anomalous host, system, or terminal can be detected when a deviation from the baseline is found. FIG. 2E depicts an example attack pattern tuning GUI 250 for anomaly attack patterns. The example GUI 250 includes an available attack patterns section 252, an attack pattern details section 254, a first possible thresholds section 256, and a second possible thresholds section 258.

Figure 3:
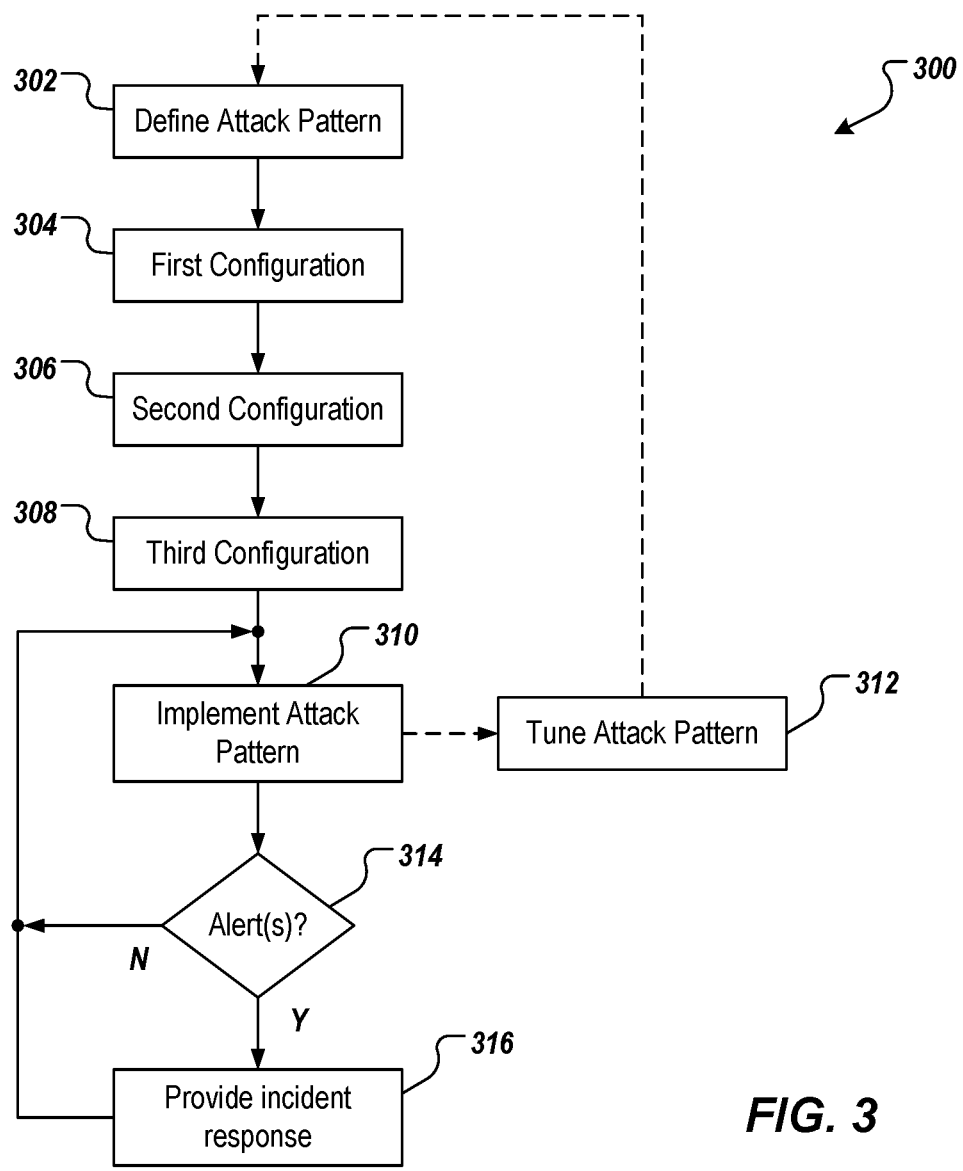
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices. For example, the example process 300 can be provided by the example reference architecture 100 of FIG. 1.

An attack pattern is provided (302). In some examples, the attack pattern is provided as computer-executable code. For example, a user can use a GUI (e.g., the GUI 200 of FIG. 1) to input a detection technique (e.g., metrics: [fact], [method]), an attack scenario (e.g., subject, target, context→environment, context→execution, context→resource, action), and detection logic (e.g., base observations, threshold). In some examples, an attack pattern engine receives the user input and provides the specification of the attack pattern (e.g., in the APSL). In some examples, the attack pattern is provided as a predefined attack pattern (e.g., a default attack pattern provided from an attack pattern datastore), and user input can be provided to modify the default attack pattern (e.g., customize the attack pattern).

First configuration information is provided (304). In some examples, the first configuration information includes business and/or technical configuration information. For example, a user can use a GUI (e.g., the GUI 200 of FIG. 2A) to input the first configuration information. Second configuration information is provided (306). In some examples, the second configuration information includes business relevance configuration information. For example, a user can use a GUI (e.g., the GUI 218 of FIG. 2B) to input the second configuration information. Third configuration information is provided (308). In some examples, the third configuration information includes response configuration information. For example, a user can use a GUI (e.g., the GUI 218 of FIG. 2B) to input the third configuration information.

The attack pattern is implemented (310). For example, the user activates the attack pattern (e.g., by clicking on the "Activate Pattern" button 208 of the GUI 200 of FIG. 2A). In response to the attack pattern being implemented, the APF framework of the present disclosure processes interactions with the target system (EIS) to detect potential end-to-end instructions. In some examples, the attack pattern is tuned (312) (e.g., the dashed connectors indicate optional actions). For example, the user can adjust thresholds of the attack pattern (e.g., using the GUI 250 of FIG. 2E). The example process 300 loops back to included adjusted thresholds in the attack pattern specification.

It is determined whether to generate one or more alerts (314). For example, the APF of the present disclosure monitors interactions with the target system based on the attack pattern and determines whether an alert is to be generated (e.g., based on the detection technique, the attack scenario, and the detection logic of the attack pattern specification. If an alarm is not to be generated, the example process 300 loops back. If an alert is to be generated, an incident response alert is provided (316), and the example process 300 loops back.

Figure 4:
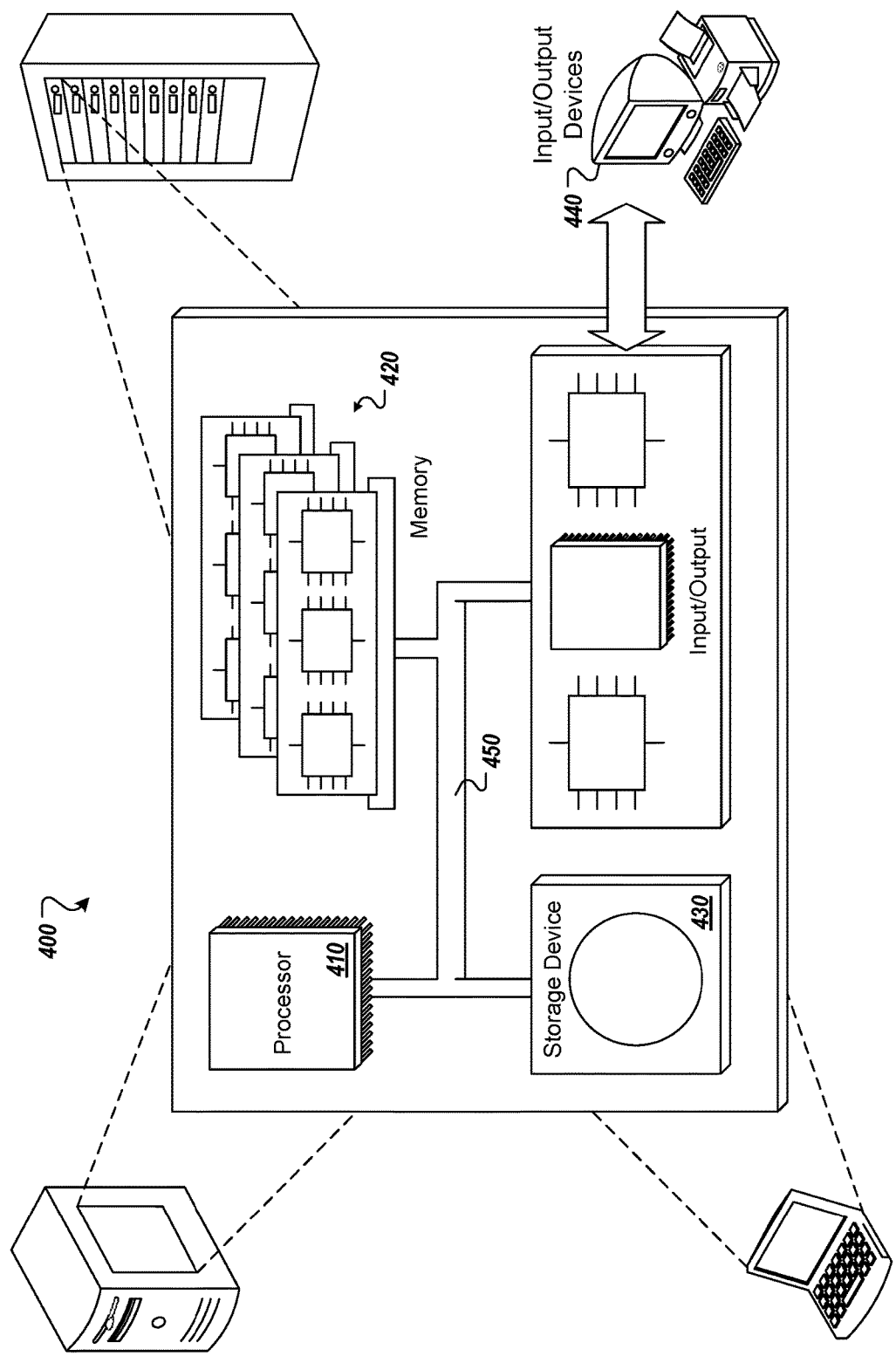
FIG. 4 is a schematic illustration of example computer systems that may be employed for implementations of the present disclosure.

FIG. 4 depicts a schematic diagram of an example computing system 400. The system 400 may be used to perform the operations described with regard to one or more implementations of the present disclosure. For example, the system 400 may be included in any or all of the server components, or other computing device(s), discussed herein. The system 400 may include one or more processors 410, one or more memories 420, one or more storage devices 430, and one or more input/output (I/O) devices 440. The components 410, 420, 430, 440 may be interconnected using a system bus 450.

The processor 410 may be configured to execute instructions within the system 400. The processor 410 may include a single-threaded processor or a multi-threaded processor. The processor 410 may be configured to execute or otherwise process instructions stored in one or both of the memory 420 or the storage device 430. Execution of the instruction(s) may cause graphical information to be displayed or otherwise presented via a user interface on the I/O device 440. The processor(s) 410 may include the CPU.

The memory 420 may store information within the system 400. In some implementations, the memory 420 is a computer-readable medium. In some implementations, the memory 420 may include one or more volatile memory units. In some implementations, the memory 420 may include one or more non-volatile memory units. The memory 420 may include the hybrid main memory system.

The storage device 430 may be configured to provide mass storage for the system 400. In some implementations, the storage device 430 is a computer-readable medium. The storage device 430 may include a floppy disk device, a hard disk device, an optical disk device, a tape device, or other type of storage device. The I/O device 440 may provide I/O operations for the system 400. In some implementations, the I/O device 440 may include a keyboard, a pointing device, or other devices for data input. In some implementations, the I/O device 440 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a backend component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
receiving, by the one or more processors, parameters defining a detection technique, an attack scenario, and a detection logic;
receiving, by the one or more processors, configuration data that is specific to a target system that is to be monitored, the configuration data comprising non-technical parameters indicating a significance of the target system relative to an external network and technical parameters indicating features of the target system associated with the attack scenario;
providing, by the one or more processors, an attack pattern using a specification language, the attack pattern being based on the parameters and the configuration data, the attack pattern being defined using a computer-executable description of the attack scenario and comprising a plurality of adjustable metrics defining a misuse of the target system and an anomaly of the target system, the specification language comprising a template of the attack pattern and supporting a definition, an update, and a management of the attack pattern relative to an attack pattern lifecycle;
determining, by the one or more processors, a baseline behavior of the target system, the baseline behavior comprising adjustable parameters defining one or more thresholds of deviations from the baseline behavior corresponding to the anomaly;
monitoring, by the one or more processors, the target system based on the baseline behavior, the attack pattern, and data provided by one or more logs of the target system;
selectively generating, by the one or more processors and based on monitoring, an alert indicating at least one of a potential simple end-to-end intrusion into the target system and a potential complex end-to-end intrusion into the target system, the alert being associated with at least one of the misuse of the target system and the anomaly of the target system; and
updating the configuration data, the baseline behavior, and the attack pattern, based on the alert, by modifying at least one of the plurality of adjustable metrics to reduce future false alerts.

2. The method of claim 1, wherein the configuration data comprises one or more of exploitability, target significance, potential downtime, social media impact, patch provision window, legal implication, and corporate requirement relevance.

3. The method of claim 1, wherein the configuration data comprises one or more of vulnerability type, severity level, log relevance, security notes, and execution frequency.

4. The method of claim 1, further comprising tuning the attack pattern by adjusting one or more thresholds.

5. The method of claim 1, wherein providing the attack pattern comprises providing one or more query scripts based on the parameters and the configuration data, the one or more query scripts being executed over the data provided by one or more logs during monitoring of the target system.

6. The method of claim 1, wherein the attack pattern is one of a misuse pattern and an anomaly pattern.

7. The method of claim 1, wherein monitoring comprises:
comparing the data provided by one or more logs of the target system to parameters of the attack pattern; and
determining that at least a portion of the data matches the parameters of the attack pattern, and in response, generating the alert.

8. A non-transitory computer-readable storage medium coupled to one or more processors and having instructions stored thereon which, when executed by the one or more processors, cause the one or more processors to perform operations comprising:
receiving parameters defining a detection technique, an attack scenario, and a detection logic;
receiving configuration data that is specific to a target system that is to be monitored, the configuration data comprising non-technical parameters indicating a significance of the target system relative to an external network and technical parameters indicating features of the target system associated with the attack scenario;
providing an attack pattern using a specification language, the attack pattern being based on the parameters and the configuration data, the attack pattern being defined using a computer-executable description of the attack scenario and comprising a plurality of adjustable metrics defining a misuse of the target system and an anomaly of the target system, the specification language comprising a template of the attack pattern and supporting a definition, an update, and a management of the attack pattern relative to an attack pattern lifecycle;
determining a baseline behavior of the target system, the baseline behavior comprising adjustable parameters defining one or more thresholds of deviations from the baseline behavior corresponding to the anomaly;
monitoring the target system based on the baseline behavior, the attack pattern and data provided by one or more logs of the target system;
selectively generating, based on monitoring, an alert indicating at least one of a potential simple end-to-end intrusion into the target system and a potential complex end-to-end intrusion into the target system, the alert being associated with at least one of the misuse of the target system and the anomaly of the target system; and
updating the configuration data, the baseline behavior, and the attack pattern, based on the alert, by modifying at least one of the plurality of adjustable metrics to reduce future false alerts.

9. The non-transitory computer-readable storage medium of claim 8, wherein the configuration data comprises one or more of exploitability, target significance, potential downtime, social media impact, patch provision window, legal implication, and corporate requirement relevance.

10. The non-transitory computer-readable storage medium of claim 8, wherein the configuration data comprises one or more of vulnerability type, severity level, log relevance, security notes, and execution frequency.

11. The non-transitory computer-readable storage medium of claim 8, wherein operations further comprise tuning the attack pattern by adjusting one or more thresholds.

12. The non-transitory computer-readable storage medium of claim 8, wherein providing the attack pattern comprises providing one or more query scripts based on the parameters and the configuration data, the one or more query scripts being executed over the data provided by one or more logs during monitoring of the target system.

13. The non-transitory computer-readable storage medium of claim 8, wherein the attack pattern comprises one of a misuse pattern and an anomaly pattern.

14. The non-transitory computer-readable storage medium of claim 8, wherein monitoring comprises: comparing the data provided by one or more logs of the target system to parameters of the attack pattern; and determining that at least a portion of the data matches the parameters of the attack pattern, and in response, generating the alert.

15. A system, comprising:
a computing device; and
a computer-readable storage device coupled to the computing device and having instructions stored thereon which, when executed by the computing device, cause the computing device to perform operations comprising:
receiving parameters defining a detection technique, an attack scenario, and a detection logic;
receiving configuration data that is specific to a target system that is to be monitored, the configuration data comprising non-technical parameters indicating a significance of the target system relative to an external network and technical parameters indicating features of the target system associated with the attack scenario;
providing an attack pattern using a specification language, the attack pattern being based on the parameters and the configuration data, the attack pattern being defined using a computer-executable description of the attack scenario and comprising a plurality of adjustable metrics defining a misuse of the target system and an anomaly of the target system, the specification language comprising a template of the attack pattern and supporting a definition, an update, and a management of the attack pattern relative to an attack pattern lifecycle;
determining a baseline behavior of the target system, the baseline behavior comprising adjustable parameters defining one or more thresholds of deviations from the baseline behavior corresponding to the anomaly;
monitoring the target system based on the baseline behavior, the attack pattern and data provided by one or more logs of the target system;
selectively generating, based on monitoring, an alert indicating at least one of a potential simple end-to-end intrusion into the target system and a potential complex end-to-end intrusion into the target system, the alert being associated with at least one of the misuse of the target system and the anomaly of the target system; and
updating the configuration data, the baseline behavior, and the attack pattern, based on the alert, by modifying at least one of the plurality of adjustable metrics to reduce future false alerts.

16. The system of claim 15, wherein the configuration data comprises one or more of exploitability, target significance, potential downtime, social media impact, patch provision window, legal implication, and corporate requirement relevance.

17. The system of claim 15, wherein the configuration data comprises one or more of vulnerability type, severity level, log relevance, security notes, and execution frequency.

18. The system of claim 15, wherein operations further comprise tuning the attack pattern by adjusting one or more thresholds.

19. The system of claim 15, wherein providing the attack pattern comprises providing one or more query scripts based on the parameters and the configuration data, the one or more query scripts being executed over the data provided by one or more logs during monitoring of the target system.

20. The system of claim 15, wherein the attack pattern comprises one of a misuse pattern and an anomaly pattern.

* * * * *